US010497172B2

United States Patent
Saito et al.

(10) Patent No.: US 10,497,172 B2
(45) Date of Patent: Dec. 3, 2019

(54) PHOTOREALISTIC FACIAL TEXTURE INFERENCE USING DEEP NEURAL NETWORKS

(71) Applicant: Pinscreen, Inc., Westlake Village, CA (US)

(72) Inventors: Shunsuke Saito, Los Angeles, CA (US); Cosimo Wei, Los Angeles, CA (US); Liwen Hu, Los Angeles, CA (US); Hao Li, Santa Monica, CA (US)

(73) Assignee: Pinscreen, Inc., Westlake Village, CA (US)

( * ) Notice: Subject to any disclaimer, the term of this patent is extended or adjusted under 35 U.S.C. 154(b) by 206 days.

(21) Appl. No.: 15/829,064

(22) Filed: Dec. 1, 2017

(65) Prior Publication Data

US 2018/0158240 A1    Jun. 7, 2018

Related U.S. Application Data

(60) Provisional application No. 62/428,975, filed on Dec. 1, 2016.

(51) Int. Cl.
*G06T 17/20* (2006.01)
*G06K 9/66* (2006.01)
(Continued)

(52) U.S. Cl.
CPC .......... *G06T 17/20* (2013.01); *G06K 9/00214* (2013.01); *G06K 9/00228* (2013.01);
(Continued)

(58) Field of Classification Search
CPC .... G06N 20/00; G06N 5/025; G06K 9/00295; G06K 9/00369
(Continued)

(56) References Cited

U.S. PATENT DOCUMENTS 6,773,714 B2 *   8/2004   Dunn ................... A61K 9/0024
                                                     424/426
6,876,754 B1 *   4/2005   Kellner ................... G06T 11/00
                                                     382/103

(Continued)

OTHER PUBLICATIONS

The International Bureau of WIPO, International Preliminary Report on Patentability for PCT Application No. PCT/US2017/064239, dated Jun. 4, 2019.

*Primary Examiner* — Yosef Kassa
(74) *Attorney, Agent, or Firm* — SoCal IP Law Group LLP; Jonathan Pearce

(57) ABSTRACT

A method for generating three-dimensional facial models and photorealistic textures from inferences using deep neural networks relies upon generating a low frequency and a high frequency albedo map of the full and partial face, respectively. Then, the high frequency albedo map may be used for comparison with correlation matrices generated by a neural network trained by a large scale, high-resolution facial dataset with simulated partial visibility. The corresponding correlation matrices of the complete facial textures can then be retrieved. Finally, a full facial texture map may be synthesized, using convex combinations of the correlation matrices. A photorealistic facial texture for the three-dimensional face rendering can be obtained through optimization using the deep neural network and a loss function that incorporates the blended target correlation matrices.

20 Claims, 6 Drawing Sheets

(51) Int. Cl.
*G06K 9/00* (2006.01)
*G06T 11/00* (2006.01)
*G06T 15/04* (2011.01)

(52) U.S. Cl.
CPC ........... *G06K 9/00241* (2013.01); *G06K 9/66* (2013.01); *G06T 11/001* (2013.01); *G06T 15/04* (2013.01)

(58) Field of Classification Search
USPC ................ 382/115, 118, 128, 154, 156, 159; 128/925; 706/15, 25
See application file for complete search history.

(56) References Cited

U.S. PATENT DOCUMENTS

| | | | | |
|---|---|---|---|---|
| 6,879,709 B2 * | 4/2005 | Tian | ................... | G06K 9/00308 340/5.83 |
| 6,965,684 B2 * | 11/2005 | Chen | ................... | G06K 9/00228 382/103 |
| 8,553,037 B2 * | 10/2013 | Smith | ..................... | G06T 13/40 345/473 |
| 8,965,762 B2 * | 2/2015 | Song | ................... | G06K 9/00268 382/118 |

* cited by examiner

PHOTOREALISTIC FACIAL TEXTURE INFERENCE USING DEEP NEURAL NETWORKS

RELATED APPLICATION INFORMATION

This patent claims priority from U.S. provisional patent application No. 62/428,975 entitled "Photorealistic Facial Texture Inference Using Deep Neural Networks" filed Dec. 1, 2016.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to photorealistic facial texture inference using deep neural networks.

Description of the Related Art

One aspect of three-dimensional rendering of human faces, that has persisted in its difficulty has been facial textures. Simply generating and rendering an overall facial shape that largely corresponds to the facial shape of a particular person or to a modelled person has been relatively straightforward for a number of years.

Microsoft® Kinect®-like infrared scanners with mass market penetration have been capable of using infrared light and associated cameras to develop facial models for a number of years. In more scientific or serious creative spaces, complex rigs of cameras, lighting, and three-dimensional capture systems have been able to generate extremely detailed three-dimensional maps of individual faces for years as well.

However, facial textures, including pores, hairs, stubble, and similar details, have only recently become capable of being modelled. To do so, very high-resolution infrared cameras, lighting and specialized systems are required. These systems map every inch of texture of a human face, then model it in three dimensions. The results are extremely accurate, but the cost of creating them is also extremely high. One must spend entire days or half-days with the setup, scanning and ensuring that the results are sufficient for the desired purposes. As a result, these types of capabilities are typically only available to motion picture studios or to video game creators who wish to represent actors physically within the game world.

Figure 1:
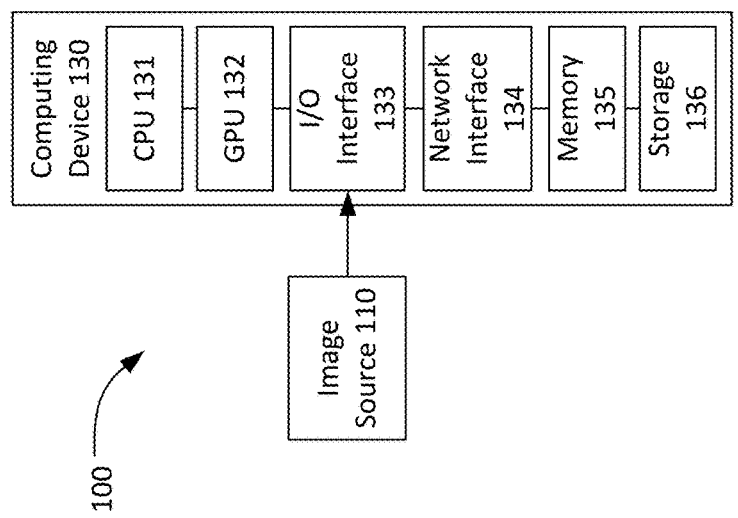
FIG. 1 is a structural diagram of a system for photorealistic facial texture interference using deep neural networks.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

It is therefore desirable to create high-resolution facial textures from individual photographs without the need for specialized equipment or significant pre-planning. The present system enables that process to take place through the application of deep neural networks, and draws inferences from as little as a single facial photograph in any pose.

Part of the difficulty in correctly detecting facial texture from a single image is a lack of resolution showing the texture, and that most facial pictures are posed in such a way that large portions of an individual's face are not visible in any given photograph. Thus, actual recreation of facial texture for the entire face must first actually recreate the entire face geometry before facial texture recreation is even possible.

In order to enable this process, the system draws upon a trained neural network of facial textural features that can be used to devolve a single image into a substantial estimation of the facial features, pose, and three-dimensional facial shape that led to the single image. In particular, the system examines the input of a single image, selects an associated pose, generates a three-dimensional model, and then generates albedo maps. Then, the system relies upon a trained neural network based upon hundreds or thousands of real human faces to select facial textures that appear most like the textures visible in the input image.

As used herein, the words "facial texture" and "texture," unless otherwise shown from the context, mean mesoscopic details of a human face. These phrases do not mean large features such as eyes, nose, ears, lips, or teeth. However, these phrases do mean each individual strand of stubble or beard, individual pores, freckles, pigmentation, pock marks or acne scars, and other small variations in facial skin three-dimensional data that account for an overall dithered or varied look to all human skin. Such features typically have been uncommon in all but the best computer models of faces. The absence of facial textures in most facial three-dimensional models is one aspect of the so-called "uncanny valley" in video game characters which look a great deal like their human counterparts, but are sufficiently distinct as to appear not-quite-right to a casual observer.

Though the result of this system may not be a literal match of facial texture from the individual, it is a very convincing facsimile. And, as a result of the application of hundreds or thousands of facial texture images in training the neural network, the result is incredibly life-like and accurate to human skin of virtually all types. The three-dimensional models generated from but a single image are photorealistic and generally match well with real-life images of that person in other poses and are high-quality and high-resolution renderings of those individual's faces.

Description of Apparatus

Turning first to FIG. 1, a structural diagram of a system for photorealistic facial texture interference using deep neural networks is shown. The system 100 includes an image source 110, and a computing device 130. Multiple computing devices may be used, but only one is required. And, the image source 110 may be storage (e.g. storage 136) on the computing device 130 itself or may be external, as shown.

The image source 110 may be a still camera or a video camera capturing an image. The image source may be a short term or long-term storage device holding data that represents images. For example, the image source 110 may be a database of images, may be the Internet, or may be any number of other sources of image data. The associated image data, as discussed more fully below, is explicitly not an image generated using any complex lighting or capture system or any high-resolution depth sensors such that any actual facial texture data is contained within the image data itself. Instead, the image is a typical, two-dimensional image format such as PNG, JPG, BMP, and may be in almost any resolution, so long as a face is recognizable as human.

The computing device 130 includes a central processing unit (CPU) 131, a graphics processing unit (GPU) 132, an input-output (I/O) interface 133, a network interface 134, memory 135, and storage 136.

The CPU 131 may execute instructions associated with an operating system for the computing device 130 as well as instructions associated with one or more applications suitable for enabling the functions described herein. The CPU 131 may be or include one or more microprocessors, microcontrollers, digital signal processors, application specific integrated circuits (ASICs), or a system-on-a-chip (SOCs). The CPU 131 may be specialized, designed for operations upon visual, graphical, or audio data or may be general purpose processors. Though identified as a central processing unit, the CPU 131 may in fact be multiple processors, for example multi-core processors or a series of processors joined by a bus to increase the overall throughput or capabilities of the CPU 131.

The GPU 132 may execute instructions suitable for enabling the functions described herein. In particular, the GPU 132 may be used in connection with particular image-related operations which the GPU 132 is uniquely suited to perform. The GPU 132 may be any of the things that the CPU 131 is. However, the GPU 132 is distinct in that it is a specialized processor that is designed for the purpose of processing visual data, particularly vector and shading, and perform faster memory operations and access, along with performing specialized lighting operations. The instruction sets and memory in the GPU 132 are specifically designed for operation upon graphical data. In this way, the GPU 132 may be especially suited to operation upon the image data or to quickly and efficiently performing the complex mathematical operations described herein. Like the CPU 131, the GPU 132 is shown as a single graphics processing unit, but may actually be one or more graphics processing units in a so-called multi-core format or linked by a bus or other connection that may together be applied to a single set of or to multiple processing operations.

The I/O interface 133 may include one or more general purpose wired interfaces (e.g. a universal serial bus (USB), high definition multimedia interface (HDMI)), one or more connectors for storage devices such as hard disk drives, flash drives, or proprietary storage solutions.

The network interface 134 may include radio-frequency circuits, analog circuits, digital circuits, one or more antennas, and other hardware, firmware, and software necessary for network communications with external devices. The network interface 134 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, Zig-Bee®, or some other public or proprietary wireless personal area network protocol.

The network interface 134 may include one or more specialized processors to perform functions such as coding/decoding, compression/decompression, and encryption/decryption as necessary for communicating with external devices using selected communications protocols. The network interface 134 may rely on the CPU 131 to perform some or all of these functions in whole or in part.

The memory 135 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 135 may store software programs and routines for execution by the CPU 131 or GPU 132 (or both together). These stored software programs may include operating system software. The operating system may include functions to support the I/O interface 133 or the network interface 134, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 136 may be or include non-volatile memory such as hard disk drives, flash memory devices designed for long-term storage, writable media, and other proprietary storage media, such as media designed for long-term storage of image data.

In some cases, one or more additional computing devices, like computing device 130, may be connected by the network interface 134 which may be a wired interface, such as Ethernet, universal serial bus (USB), or a wireless interface such as 802.11x, LTE, or other wireless protocol to enable the additional, computing devices to perform some or all of the operations discussed herein. For example, the CPU 131 and GPU 132 of the computing device 130 may be less powerful than that available in a connected system (e.g. a multicore process or group of multicore processors) or a group of GPUs (e.g. a single powerful GPU or a set of GPUs interconnected by SLI or CrossFire®) such that a connected computing device is better-capable of performing processor-intensive tasks such as the convolution or segmentation processes discussed more fully below. In some implementations, the one or more additional computing devices may be used to perform more processor-intensive tasks, with the tasks being offloaded via the I/O interface 133 or network interface 134. In particular, the training processes discussed herein may rely upon or more external computing devices.

Figure 2:
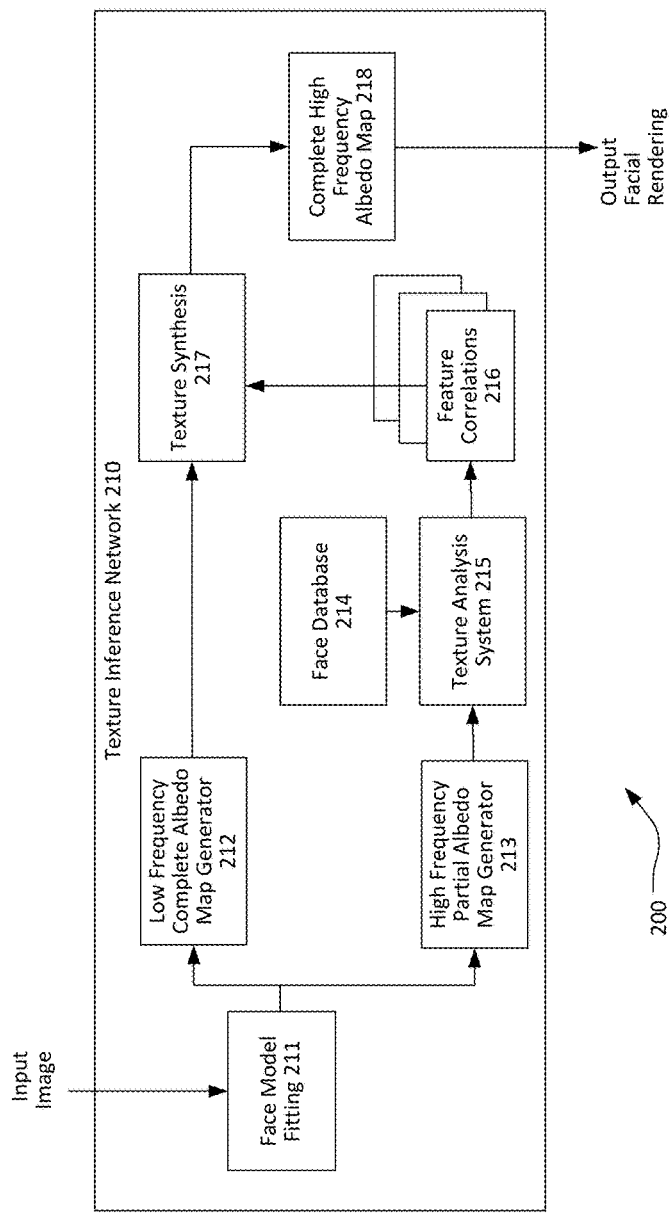
FIG. 2 is a functional diagram of a texture inference network for a system for photorealistic facial texture inference using deep neural networks.

FIG. 2 is a functional diagram of a texture inference network 210 for a system 200 for photorealistic facial texture inference using deep neural networks. The system 200 receives an input image selected, for example, by a user.

The first function is face model fitting 211. The face model fitting is a system, described in patent application Ser. No. 15/438,551 entitled "Real-Time Facial Segmentation and Performance Capture from RGB Input" owned by the assignee of this patent application, that may be used to generate an overall three-dimensional map of a human face from a single input image. This shape may, preferably, be a three-dimensional model and may be derived using a series of neural networks to best-match the pose, model, shape, and appearance of the input two-dimensional image by segmenting the face into a number of segments, then selecting those that most-closely match the overall facial shape from the image.

Next, the low frequency complete albedo map generator 212 and the high frequency partial albedo map generator 213 operate to generate, respectively, a low frequency albedo map of a complete face and a high frequency albedo map of only the portion of the face that is visible in the image.

The low frequency albedo map that is a complete map is used to estimate the entirety of the human face based upon the visible portions of the face from the input image and a neural network that may be used to estimate, based upon the visible portions of the face, the remainder of the human face.

The high frequency albedo map of only the visible portions of the face from the input image is created so that greater detail may be used during texture analysis in order to most-accurately match the input image with images from the training data set.

A face database 214 is also present in the texture inference network 210. The face database 214 is a set of high-resolution facial images including facial texture. The face database 214 preferably includes a set of carefully posed and lighted human faces with three-dimensional data of a resolution sufficient to capture facial textures extracted therefrom. The so-called "Chicago Face Database" was used as a face database 214 in creating the results shown herein.

A texture analysis system 215 is also present in the texture inference network 210. The texture analysis system 215 compares the high-frequency albedo map with the data in the face database 214 in order to find the closest matches (or blends of matches) that correspond to the facial textures of the input image. In reality, no single image will completely match across an entire face for facial textures. However, blendweights for a series of faces from the face database 214 (potentially hundreds of faces combined) may be used to mathematically combine facial textures from multiple faces in such a way that a desired facial texture may be found. This process is performed by the texture analysis system 215.

The resulting blendweights are created as a part of the feature correlations 216 which identify particular facial texture features that are most like those of the high frequency partial albedo map.

The texture synthesis system 217 takes the low frequency complete facial albedo map and combines it with feature correlations determined using the texture analysis system 215 to select features and textures that are most-like the input image (in the associated pose and estimated lighting). The texture synthesis system 217 can work to minimize the differences between the calculated facial features and the actual input image, when compared. In this way, an output facial rendering may be created that realistically models the input image while incorporating appropriate facial textures.

Figure 3:
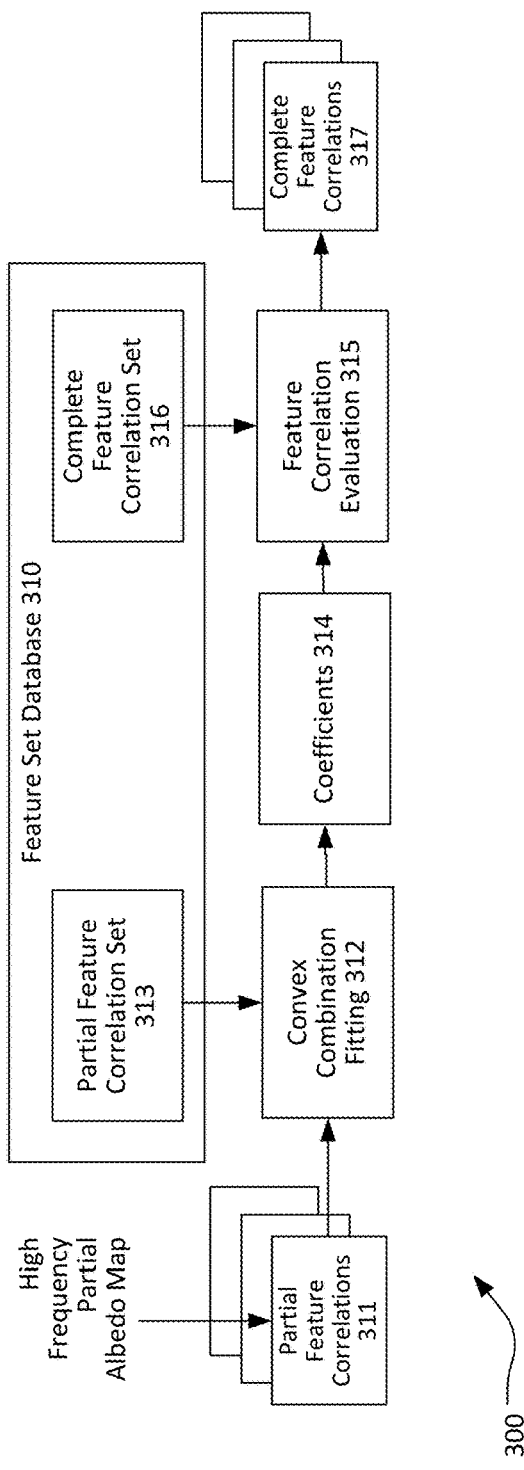
FIG. 3 is a functional diagram of texture analysis system within a system for photorealistic facial texture inference using deep neural networks.

FIG. 3 is a functional diagram of a texture analysis system 300 within a system for photorealistic facial texture inference using deep neural networks. This system is used to identify the set of facial texture features from those within a facial database that most closely-matches the input image.

The texture analysis system 300 uses the high frequency partial albedo map that was created from the visible portions of the face in the input image. Several functions are performed by the system 300.

First, partial feature correlations 311 are generated from the map to identify the features (within any number of faces) that appear to correspond most closely with the high frequency albedo map. Once those feature correlations are done, the feature set database 310 may be queried using the partial feature correlations to obtain the partial feature correlation set 313. This set 313 is further narrowed by convex combination fitting 312 to limit the desired features to those that fall within those most likely to correspond to the input image, particularly for those input images of low quality. Without convex constraints (effectively, weeding out the extremes of potential facial textures), low-quality input images can result in facial textures that are unrealistic or overly-textured compared to a more likely actual facial texture.

This process enables the system 300 to select coefficients 314 that may be used to select facial textural features. Those coefficients 314 are used by the feature correlation evaluation 315 to query the feature set database 310 for a complete feature correlation set 316, including for areas not visible in the high frequency partial albedo map. The feature correlation evaluation generates full feature correlations 317 that may be used to generate facial texture for the entire three-dimensional, modeled face.

Description of Processes

Figure 4:
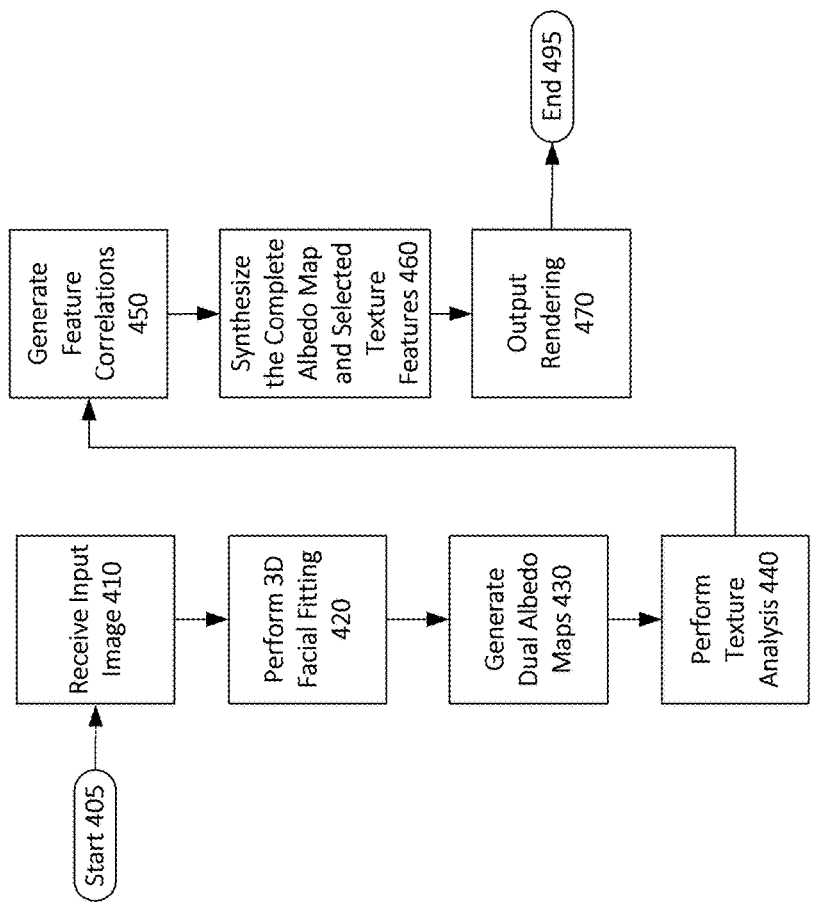
FIG. 4 is a flowchart of a process for photorealistic facial texture inference using deep neural networks.

FIG. 4 is a flowchart of a process for photorealistic facial texture inference using deep neural networks. The flowchart has a start 405 and an end 495 that take place for each input image. Multiple images may be input, if available, and the results may be merged in any number of ways, but the process works quite well with even a single image as input.

First, an input image is received at 410. As indicated above, the input image may be virtually any conventional two-dimensional image of various resolutions. The system will attempt to match the characteristics of the input image regardless of its quality.

Following receipt of the input image, three-dimensional facial fitting is performed at 420. To fit the image to a facial model, a face shape V, an albedo map I, the rigid head pose (R, t), and the perspective transformation $\Pi_P$ (V) with the camera parameters P are computed. This is done using a principal component analysis (PCA) model fitting technique. The low-frequency facial albedo I and the shape V are represented as a multi-linear PCA model with n=53 k vertices and 106 k faces as follows:

$$V(\alpha_{id}, \alpha_{exp}) = \bar{V} + A_{id}\alpha_{id} + A_{exp}\alpha_{exp},$$

$$I(\alpha_{al}) = \bar{I} + A_{al}\alpha_{al},$$

Where the identity, expression, and albedo are represented as a multivariate normal distribution with the corresponding basis: $A_{id} \in \mathbb{R}^{3n \times 80}$, $A_{exp} \in \mathbb{R}^{3n \times 29}$, and $A_{al} \in \mathbb{R}^{2n \times 80}$, the mean $\bar{V}=V_{id}+V_{exp}\in R^{3n}$, and $\bar{I}\in R^{3n}$, and the corresponding standard deviation $\sigma_{exp}\in R^{29}$, and $\sigma_{al}$ $\sigma$ $R^{80}$. One may use Lambertian surface reflectance and model the illumination of the face using a second order Spherical Harmonics, denoting the illumination $L\in R^{27}$. A Basel Face Model dataset may be used for $A_{id}$, $A_{al}$, $\bar{V}$, and $\bar{I}$, and FaceWarehouse for $A_{exp}$. All unknowns may be computed $\chi=\{V, I, R, t, P, L\}$ with the objective function:

$$E(\chi)=w_cE_c(\chi)+w_{lan}E_{lan}(\chi)+w_{reg}E_{reg}(\chi),$$

with energy term weights $w_c=1$, $w_{lan}=10$, and $w_{reg}=2.5\times 10^{-5}$. The $E_c$ term minimizes the distance between the synthetic face and the input image and the landmark term $E_{lan}$ minimizes the distance between the facial features of the shape and the detected landmarks, and the regularization terms penalize the deviation of the fade from the normal distribution. This results in the synthetic face generally being forced to appear more like a typical face than some unusual face.

The $E_c$ term may be augmented with a visibility component:

$$E_c(\chi) = \frac{1}{|\mathcal{M}|} \sum_{p\in\mathcal{M}} \|C_{input}(p) - C_{synth}(p)\|_2,$$

where $C_{input}$ is the input image, $C_{synth}$ is the synthesized image, and $p\in M$ is a visibility pixel computed from a semantical facial segmentation estimated using a two-stream deep neural network. The segmentation mask ensures that the objective function is computed with valid face pixels for more robust operation in occluded situations (e.g. hair, hands, or other objects covering portions of the face). The landmark fitting term $E_{lan}$ and the regularization term $E_{reg}$ are defined as:

$$E_{lan}(\chi) + \frac{1}{|\mathcal{F}|} \sum_{f_i\in\mathcal{F}} \|f_i - \prod_P (RV_i + t)\|_2^2,$$

$$E_{reg}(\chi) = \sum_{i=1}^{80}\left[\left(\frac{\alpha_{id,i}}{\sigma_{id,i}}\right)^2 + \left(\frac{\alpha_{al,i}}{\sigma_{al,i}}\right)^2\right] + \sum_{i=1}^{29}\left(\frac{\alpha_{exp,i}}{\sigma_{exp,i}}\right)^2.$$

where $f_i\in F$ is a two-dimensional facial feature obtained from a method introduced by V. Kazemi and J. Sullivan in "One millisecond face alignment with ensemble regression trees" introduced in *IEEE CVPR* in 2014. The objective function may then be optimized using a Gauss-Newton solver based on iteratively reweighted least squares with three levels of pyramids. It has been observed that under this method, the optimization converges with 30, 10, and 3 Gauss-Newton steps from the coarsest level to the finest.

This process results in a complete map of the face, including regions not visible within the input image by mapping segmented regions of the face to the most likely three-dimensional model for each segment, then combining each of the segments into an entire face. However, the resulting map is of low frequency.

This low frequency, full-face map is generated at 430, with a high-frequency map generated by simply removing the shading component from the input RGB image itself. This may be done by estimating the illumination L, the surface normal N, and optimizing the partial face geometry V generated above. The same facial segmentation technique may then be used for the low frequency albedo map to extract a partial high frequency albedo map for the visible portions of the face from the input image.

Next, texture analysis is performed at 440. This process seeks to analyze the input image using a deep neural network trained with a large data set of facial textures to select the facial texture that is most like that shown in the input image.

Figure 5:
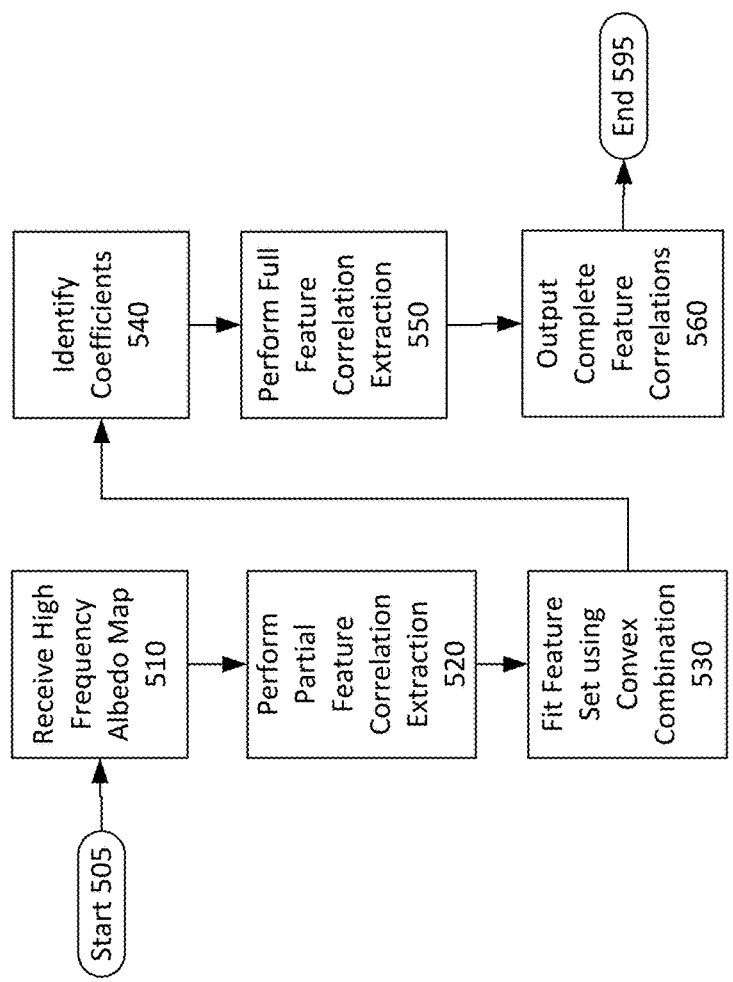
FIG. 5 is a flowchart of a process for texture analysis in a system for photorealistic facial texture inference using deep neural networks.

Turning now to FIG. 5 for a more detailed description of texture analysis. FIG. 5 is a flowchart of a process for texture analysis in a system for photorealistic facial texture inference using deep neural networks. FIG. 5 has a start 505 and an end 595, but may take place for every input image.

In general, texture analysis identifies features in the input image that correlate with features in a face database of high-resolution texture maps. In particular, many faces, tens or hundreds or thousands may be blended through correlation to those faces in various weightings or blends to create a composite set of facial texture features that most-closely match the input image. Once the correlation matrices are identified, blendweights may be selected to make the differences between the input image and a corresponding facial texture as small as possible (thereby making the images most alike).

First, the high frequency partial albedo map is received at 510. This map does not include the entirety of the face estimated, but includes only actually-visible portions of the face from the input image.

Based upon the high frequency partial albedo map, partial feature correlation extractions 520 are performed by a neural network trained with a large dataset of high resolution texture maps of faces at 520. So, for an input image I, let $F^l|(I)$ be the filter response of I on layer l. $Fl(I) \in R^{Nl\times Ml}$ where $N_l$ is the number of channels/filters and $M_l$ is the number of channels (width×height) of the feature map. In such a case, the correlation of local structures can be represented as the normalized Gramian matrix $G^l(I)$:

$$G^l(I) = \frac{1}{M_l}F^l(I)(F^l(I))^T \in R^{N_l\times N_l}$$

For a given face texture, its feature response from the latter layers and the correlation matrices from former layers sufficiently characterize the facial details to ensure photorealism and can create perceptually identical images. As a result, a complete and photorealistic facial texture can be inferred from this information using the partially-visible face in an input image $I_0$.

Only the low frequency appearance is encoded in the last few layers, so feature response from the complete low frequency albedo map $I(\alpha_{al})$ optimized above provides an estimation of the desired feature response $\hat{F}$ for $(I_0)$:

$$\hat{F}^l(I_0)=F^l(I(\alpha_{al}))$$

Thereafter, feature correlations for the entire face may be extracted.

Correlation matrices from images of different faces may be linearly blended and, when blended, the combined matrices continue to produce photorealistic results. Similarly, the desired correlation matrix can be linearly combined from a series of such matrices in a large facial texture database. The partially visible face does impose a limitation on direct linear blending because portions of the high frequency albedo map generated based upon the input image $I_0$ will contain no data.

To compensate for this shortcoming of the input images, the portions of the complete textures in the facial texture database that are not visible in the input image are masked out when performing feature extraction. To do this, a mask-out function is defined as M(I) to remove pixels in the facial database textures that are non-visible in the input image as:

$$\mathcal{M}(I)_p = \begin{cases} 0.5, & \text{if } p \text{ is non-visible} \\ I_p, & \text{otherwise} \end{cases}$$

where p is an arbitrary pixel. 0.5 is used as a constant intensity for non-visible regions of the facial textures, so that such regions may be readily identified. As a result, the new correlation matrix for layer l for each image in dataset $\{I_1, \ldots, I_K\}$ is:

$$G^l_{\mathcal{M}}(I_k) = G^l(\mathcal{M}(I_k)), \forall k \in \{1, \ldots, K\}$$

The resulting correlation matrices $\{G^l_{\mathcal{M}}(I_k), k=1, \ldots, K\}$ derived above from the facial texture database, the optimal blending weight to linearly combine them so as to minimize the difference from $G^l_{\mathcal{M}}(I_0)$ from input $I_0$ is:

$$\min_w \sum_l \left\| \sum_k w_k G^l_{\mathcal{M}}(I_k) - G^l_{\mathcal{M}}(I_0) \right\|_F$$

$$\text{s.t.} \sum_{k=1}^K w_k = 1$$

$$w_k \geq 0 \,\forall\, k \in \{1, \ldots, K\}$$

Frobenius norms of correlation matrix differences on different layers are accumulated. Extra constraints are added to the blending weight so that the blended correlation matrix is located within the convex hull of matrices derived from the database. This is used to fit feature set at 530. Other alternatives are available, such as least squares optimization without constraints, artifacts sometimes occur for portions of the input image that are of particularly poor quality. Forcing the blend weights away from the edge cases causes the resulting image to move toward a "typical" image and away from unusual ones thereby reducing artifacts almost completely.

The coefficients are identified at 540 by accumulation.

Now, the full feature correlation extraction may take place at 550 by computing the correlation matrix for the entire image:

$$\hat{G}^l(I_0) = \sum_k w_k G^l(I_k), \forall\, l$$

The result is an output of the complete feature correlations at 560 for use in textual synthesis. The textural analysis ends at 595.

Returning to FIG. 4, the feature correlations are identified in the feature correlation matrix at 450 as described above.

Once the appropriate feature correlation matrix has been created, the estimated facial textures for an entire face based upon the input image may be generated by applying the textures, based upon the correlation matrix, to the complete albedo map at 460. This is a combination of the feature response $\hat{F}$ and the full feature correlation $\hat{G}$ based upon $I_0$, the complete albedo map I that best matches both will be the best fit for a matching facial texture. Specifically, a set of high frequency preserving layers $L_G$ and low frequency preserving layers $L_F$ are selected with an effort to match $\hat{G}^l(I_0)$ and $\hat{F}^l(I_0)$ for layers in these sets, respectively.

The desired albedo map for the entire face is computed by optimizing:

$$\min_I \sum_{l \in L_F} \left\| F^l(I) - \hat{F}^l(I_0) \right\|_F^2 + \alpha \sum_{l \in L_G} \left\| G^l(I) - \hat{G}^l(I_0) \right\|_F^2$$

where α is a weight balancing the effect of high and low frequency details. If α is set to a large number (e.g. 2000), then more details are preserved than if set to a low number (e.g. 2). So, if detail in the resulting three dimensional facial textures is preferred, higher α are used.

This optimization problem is non-convex, but the gradient of $G^l(I)$ can be computed easily because it may be considered an extra layer of the neural network after layer l. The optimization is similar to the training process of a neural network with Frobenius norm as its loss function. Notably, the function is not solved for its network parameters. Instead, the input I is altered so as to minimize the differences between I and $I_0$. As should be appreciated, this results in the generated facial textures that most correspond to those of the input image.

For the Frobenius loss function:

$$\mathcal{L}(X) = \|X - A\|_F^2$$

where A is a constant matrix, and for Gramian matrix $G(X) = XX^T/n$, their gradients may be computed analytically as:

$$\frac{\partial \mathcal{L}}{\partial X} = 2(X - A)$$

$$\frac{\partial G}{\partial X} = \frac{2}{n} X$$

The derivative of every high frequency $L_d$ and low frequency $L_c$ can be computed, so the chain rule may be applied to this multi-layer neural network to back-propagate the gradient on preceding layers all the way to a first layer. In this way, the gradient of input is ∇I. Due to the number of variables and computer limitations (e.g. GPU memory), an L-BFGS solver may best optimize I. The low frequency albedo $I(\alpha_{al})$ may be used to initialize the problem.

Once the problem is optimized, the rendering may be output at 470 showing the high resolution, three-dimensional image incorporating the best-fit facial texture based upon the neural network trained facial database. The process for photorealistic facial texture inference using deep neural networks ends at 495.

Figure 6:
FIG. 6 is a series of examples of input images and the resulting facial textures and albedo maps generated by a system for photorealistic facial texture inference using deep neural networks.

FIG. 6 is a series of examples of input images and the resulting facial textures and albedo maps generated by a system for photorealistic facial texture inference using deep neural networks. A series of individuals, 604, 606, 608, 610, and 612 are shown in rows, while the input image is shown in column 602, low frequency albedo map and the high frequency albedo maps are shown in columns 602' and 602'', respectively. These two columns may be viewed as intermediate steps along the way to a completed rendering in column 602'''. Closeup images of the completed rendering are shown in columns 602'''' and 602'''''.

As can be seen, the three-dimensional renderings are convincing, but more importantly, the facial textures are likewise convincing. The method generates photorealistic results from a single input image across various facial structures, from faces in different poses, and for a wide array of skin and facial tones and textures.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of generating facial texture using a deep neural network comprising:
   receiving an image of at least a part of a human face;
   generating a low frequency albedo map for an entirety of the human face from the image, including any portion of the at least a part of the human face not visible in the image, by using a deep neural network to perform facial segmentation and landmark detection to match the three-dimensional facial geometry and thereby extract the visible facial texture map to compute the corresponding feature correlation matrices;
   generating a high frequency albedo map for only the at least a part of the human face visible within the image;
   analyzing a portion of the high frequency albedo map to identify a coefficient matrix for a convex combination of partial feature correlations from a database of high resolution texture maps of actual human faces;
   linearly combining multiple high resolution images of facial textures using the coefficient matrix and blending weights to ensure that a resulting combination is within a target feature correlation range identified by the convex combination of partial feature correlations to thereby generate the feature correlation matrices of the full face; and
   generating a full face high frequency albedo map for the image by selecting the high frequency albedo map for the entirety of the human face that minimizes the sum of the correlation matrix and the feature matrix to thereby select the full face high frequency albedo map that most corresponds to the image.

2. The method of claim 1 wherein the low frequency albedo map is generated for the entirety of the human face by calculating a face shape, an albedo map, a pose for the human face, and a perspective transformation for the face that best correspond to the at least a part of a human face in the image using a deep neural network in multiple stages.

3. The method of claim 1 wherein the correlation matrix identifies correlations to a set of blended facial characteristics for multiple images from the database of high resolution texture maps of actual human faces.

4. The method of claim 1 wherein the full face high frequency albedo map is generated for portions missing from the low frequency albedo map using the deep neural network.

5. The method of claim 1 wherein a detail weight is applied to maximize facial textures.

6. The method of claim 1 wherein a high detail weight favors high quality images of facial textures and a low detail weight favors low quality images of facial textures.

7. The method of claim 1 further comprising masking out portions of any high resolution texture maps of actual human faces from the database of high resolution texture maps of actual human faces before linearly combining multiple high resolution images of facial textures.

8. Apparatus comprising a storage medium storing a program having instructions which when executed by a processor will cause the processor to:
   receive an image of at least a part of a human face;
   generate a low frequency albedo map for an entirety of the human face from the image, including any portion of the at least a part of the human face not visible in the image, by using a deep neural network to perform facial segmentation and perform landmark detection to match the three-dimensional facial geometry and thereby extract the texture map for computing the feature correlation matrices;
   generate a high frequency albedo map for only the at least a part of the human face visible within the image;
   analyze a portion of the high frequency albedo map to identify a coefficient matrix for a convex combination of partial feature correlations from a database of high resolution texture maps of actual human faces;
   linearly combine multiple high resolution images of facial textures using the coefficient matrix and a blending weight to ensure that a resulting combination is within a target feature correlation range identified by the convex combination of partial feature correlations to thereby generate a correlation matrix; and
   generate a full face high frequency albedo map for the image by selecting the high frequency albedo map for the entirety of the human face that minimizes the sum of the correlation matrix and the feature matrix to thereby select the full face high frequency albedo map that most corresponds to the image.

9. The apparatus of claim 8 wherein the low frequency albedo map is generated for the entirety of the human face by calculating a face shape, an albedo map, a pose for the human face, and a perspective transformation for the face that best correspond to the at least a part of a human face in the image using the deep neural network in multiple stages.

10. The apparatus of claim 8 wherein the correlation matrix identifies correlations to a set of merged facial characteristics for multiple images from the database of high resolution texture maps of actual human faces.

11. The apparatus of claim 8 wherein the full face high frequency albedo map is generated for portions missing from the low frequency albedo map using the deep neural network.

12. The apparatus of claim 8 wherein a detail weight is applied to maximize facial textures.

13. The apparatus of claim 8 wherein a high detail weight favors high quality images of facial textures and a low detail weight favors low quality images of facial textures.

14. The apparatus of claim 8 wherein the instructions will further cause the processor to mask out portions of any high resolution texture maps of actual human faces from the database of high resolution texture maps of actual human faces before linearly combining of multiple high resolution images of facial textures.

15. The apparatus of claim 8 further comprising:
   the processor;
   a memory; and
   wherein the processor and the memory comprise circuits and software for performing the instructions on the storage medium.

16. A system for generating facial texture using a neural network, the system comprising:
   a processor for:
      receiving an image of at least a part of a human face;
      generating a low frequency albedo map for an entirety of the human face from the image, including any portion of the at least a part of the human face not visible in the image, by using a deep neural network to perform facial segmentation and landmark detection to match the three-dimensional facial geometry and thereby extract the texture map for computing the feature correlation matrices;
      generating a high frequency albedo map for only the at least a part of the human face visible within the image;
      analyzing a portion of the high frequency albedo map to identify a coefficient matrix for a convex combination of partial feature correlations from a database of high resolution texture maps of actual human faces;
      linearly combining multiple high resolution images of facial textures using the coefficient matrix and a blending weight to ensure that a resulting combination is within a target feature correlation range identified by the convex combination of partial feature correlations to thereby generate a correlation matrix; and
      generating a full face high frequency albedo map for the image by selecting the high frequency albedo map for the entirety of the human face that minimizes the sum of the correlation matrix and the feature matrix to thereby select the full face high frequency albedo map that most corresponds to the image.

17. The system of claim 16 wherein the low frequency albedo map is generated for the entirety of the human face by calculating a face shape, an albedo map, a pose for the human face, and a perspective transformation for the face that best correspond to the at least a part of a human face in the image using the deep neural network in multiple stages.

18. The system of claim 16 wherein the correlation matrix identifies correlations to a set of merged facial characteristics for multiple images from the database of high resolution texture maps of actual human faces.

19. The system of claim 16 wherein the full face high frequency albedo map is generated for portions missing from the low frequency albedo map using the deep neural network.

20. The system of claim 16 wherein a high detail weight favors high quality images of facial textures and a low detail weight favors low quality images of facial textures.

* * * * *